United States Patent
Janian

(10) Patent No.: US 9,939,067 B2
(45) Date of Patent: Apr. 10, 2018

(54) ELASTIC CONTACT SEAL

(71) Applicant: Robert Janian, Encino, CA (US)

(72) Inventor: Robert Janian, Encino, CA (US)

(*) Notice: Subject to any disclaimer, the term of this patent is extended or adjusted under 35 U.S.C. 154(b) by 203 days.

(21) Appl. No.: 14/998,628

(22) Filed: Dec. 7, 2015

(65) Prior Publication Data
US 2017/0159823 A1 Jun. 8, 2017

(51) Int. Cl.
*F16J 15/32* (2016.01)
*F16J 15/3268* (2016.01)

(52) U.S. Cl.
CPC ............... *F16J 15/3268* (2013.01)

(58) Field of Classification Search
CPC .... F16J 15/3232; F16J 15/3236; F16J 15/062; F16J 15/10; F16J 15/102; F16J 15/106; F16J 15/067; F16J 15/104
USPC ................. 277/560, 586, 574, 582
See application file for complete search history.

(56) References Cited

U.S. PATENT DOCUMENTS

| | | | | |
|---|---|---|---|---|
| 3,287,022 A | * | 11/1966 | Soechting | F16J 15/32 137/625.69 |
| 3,582,094 A | * | 6/1971 | Whittaker | F16J 15/56 277/584 |
| 3,693,986 A | * | 9/1972 | Lambie | F16J 15/062 277/638 |
| 4,214,629 A | * | 7/1980 | Upton | E21B 33/1294 166/129 |
| 5,692,758 A | * | 12/1997 | Wikstrom | F16J 15/106 277/591 |
| 6,039,319 A | * | 3/2000 | Coonce | F16L 23/22 277/314 |
| 6,173,964 B1 | * | 1/2001 | Bell | E21B 33/04 277/554 |
| 6,302,405 B1 | * | 10/2001 | Edwards | E21B 33/10 277/336 |

* cited by examiner

Primary Examiner — Joshua T Kennedy

(57) ABSTRACT

A mechanical seal comprising an elastomeric modified O-ring in combination backup rings typically made of a low friction material such as Teflon with matching surfaces to modified O-ring surface to provide low dynamic friction and meantime prevent seal extrusion due to high pressures and temperatures.

2 Claims, 9 Drawing Sheets

ELASTIC CONTACT SEAL

BACKGROUND OF THE INVENTION

This invention relates to mechanical seals of the type in which a modified O-ring made typically of elastomeric material such as Viton or Polyester elastomers installed between Teflon backup rings in order to prevent elastomeric O-ring extrusion and create low friction with dynamic applications. Elastomeric O-ring with Teflon backup combination is used in variety of applications and as the working requirements such as temperatures, pressures and sealing surface speeds become higher, seal assembly has to be modified accordingly in order to satisfy required working conditions, the special shape of my patent makes it possible for better seal performance such as lower friction and longer seal life with greater shaft speeds under high pressures and temperatures.

Different configurations of seal assemblies with elastomeric O-ring and Teflon backup rings are known in which O-ring is squeezed between Teflon backup rings, as pressure is applied elastomeric O-ring is compressed against Teflon backup ring along to dynamic shaft surface and gland inside diameter to seal incoming pressure, the larger contact area between elastomeric O-ring and shaft sealing surface the greater dynamic friction force, it is desirable to minimize friction force by minimizing elastomeric contact while keeping excessive elastomeric flow towards dynamic shaft surface, my patent makes it possible to minimize friction force and meantime prevent modified O-ring excessive flow towards the dynamic shaft sealing surface and prevent seal assembly from rotating inside sealing gland, most seals of this type require a different configuration for static application as opposed to dynamic application, my patent improves seal performance for both dynamic and static applications.

SUMMARY OF THE INVENTION

In accordance with the present invention, a novel elastomeric modified O-ring and a novel Teflon backup ring with specific curvature relationship to one another are used in combination offering excellent anti-extrusion and low seal wear and low friction, elastomeric modified O-ring in cross section is shaped circular on inside diameter so that there is only a line contact against dynamic shaft surface where sealing takes place, Teflon backup rings contact rest of elastic contact seal assembly against dynamic shaft surface and extrusion gap between housing inside diameter and shaft. On the sides of both modified elastomeric O-ring and backup rings where contact each other halfway up to the groove diameter an interlocking step prevents excessive flow of elastomer towards the dynamic sealing surface due to high pressures while preventing modified elastomeric O-ring from rotating inside seal gland, backup rings also are preventing seal assembly to be extruded out of seal gland through extrusion gap.

BRIEF DESCRIPTION OF THE INVENTION

Having thus described the invention in general terms, references will now be made to the description below taken in conjunction with the accompanying drawings wherein:

DETAILED DESCRIPTION OF THE INVENTION

Figure 1:
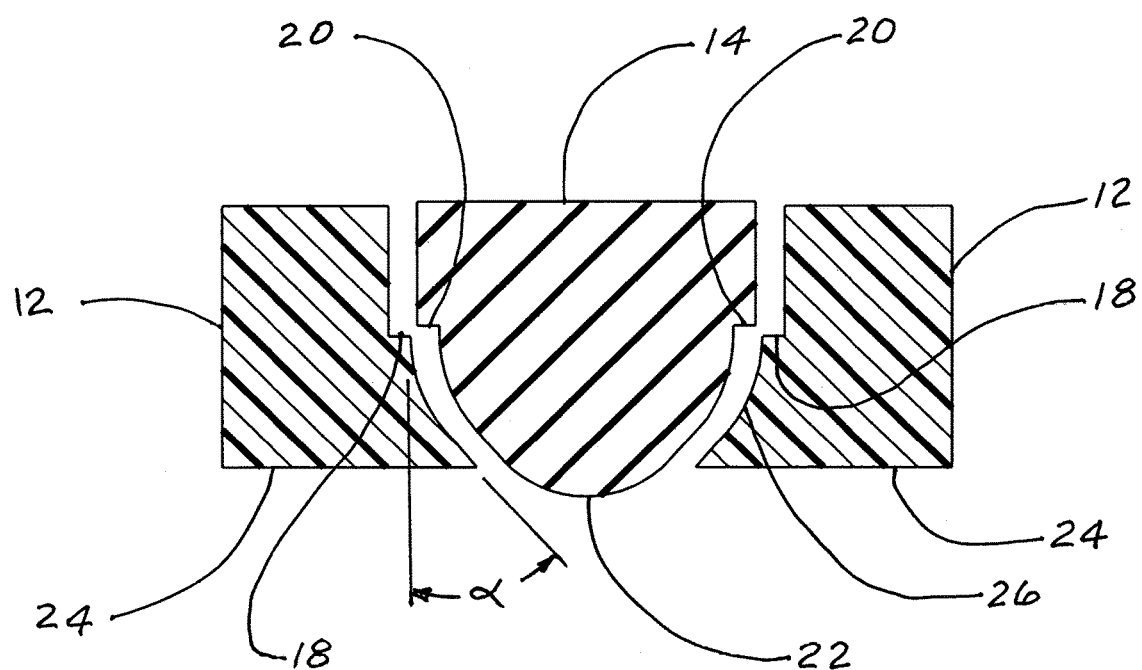
FIG. 1 is cross sectional view of Elastic Contact seal assembly 10 consisted of modified elastomeric O-ring with corresponding Teflon backups.
Figure 2:
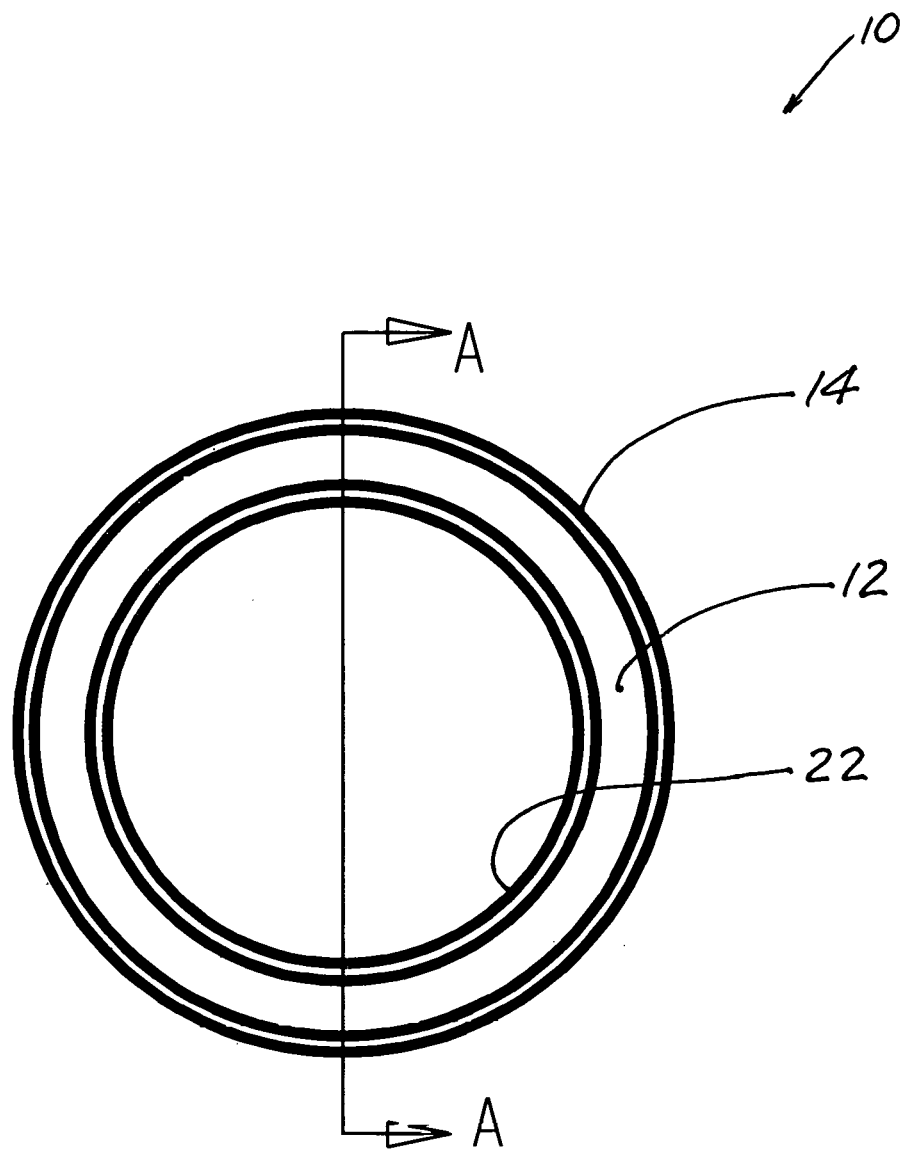
FIG. 2 is frontal view of elastic contact seal assembly.
Figure 3:
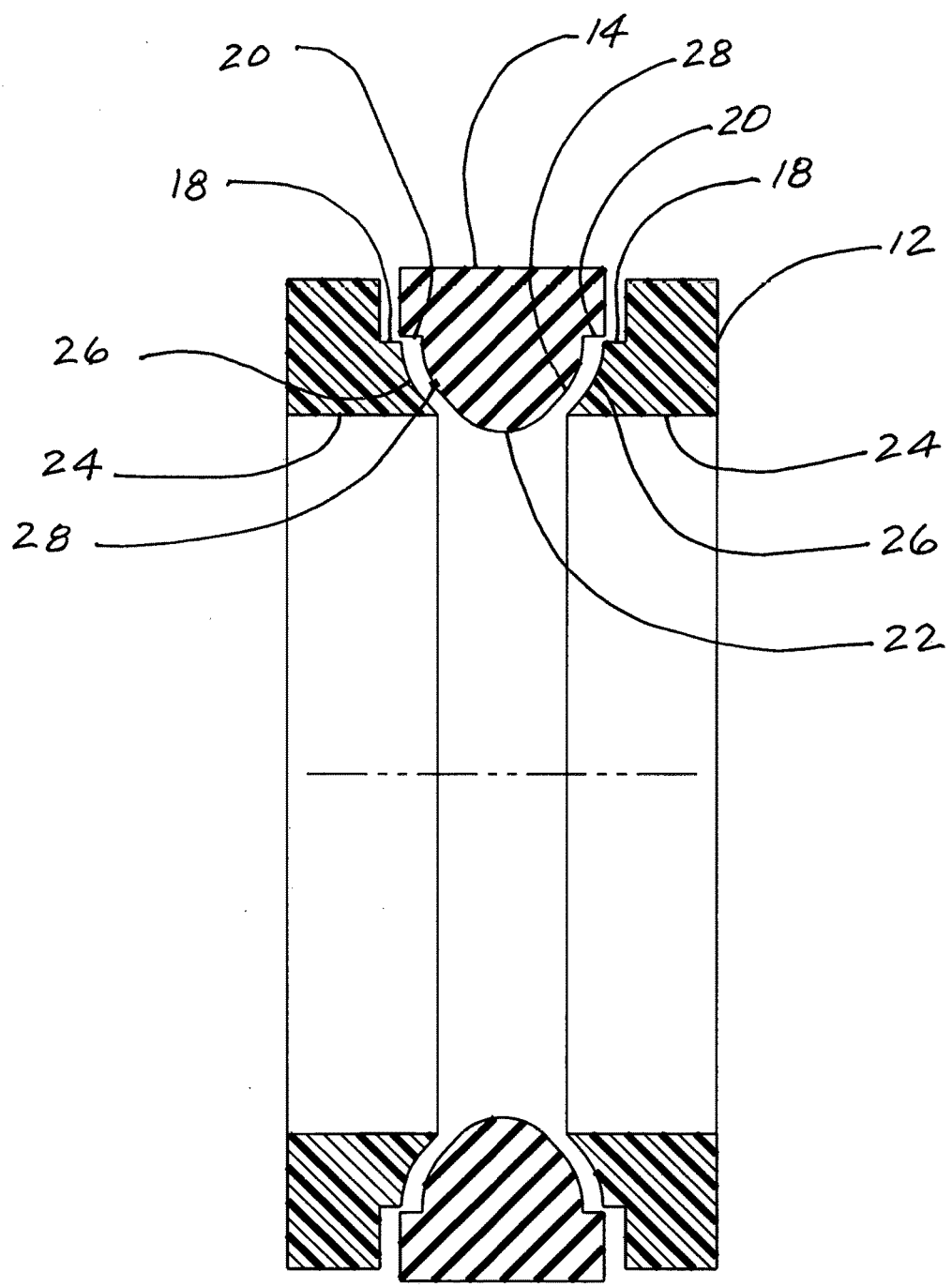
FIG. 3 is a cross-sectional view A-A of elastic contact seal assembly.
Figure 4:
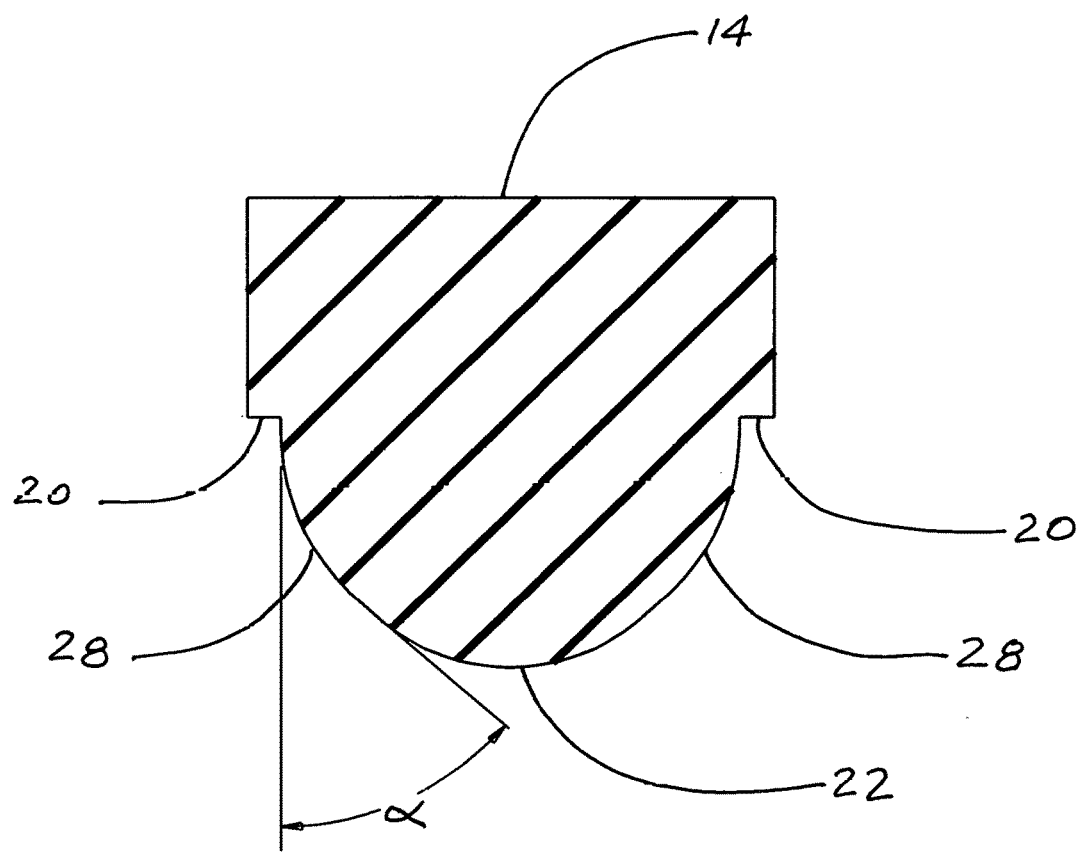
FIG. 4 shows cross sectional view of modified elastomeric O-ring.
Figure 5:
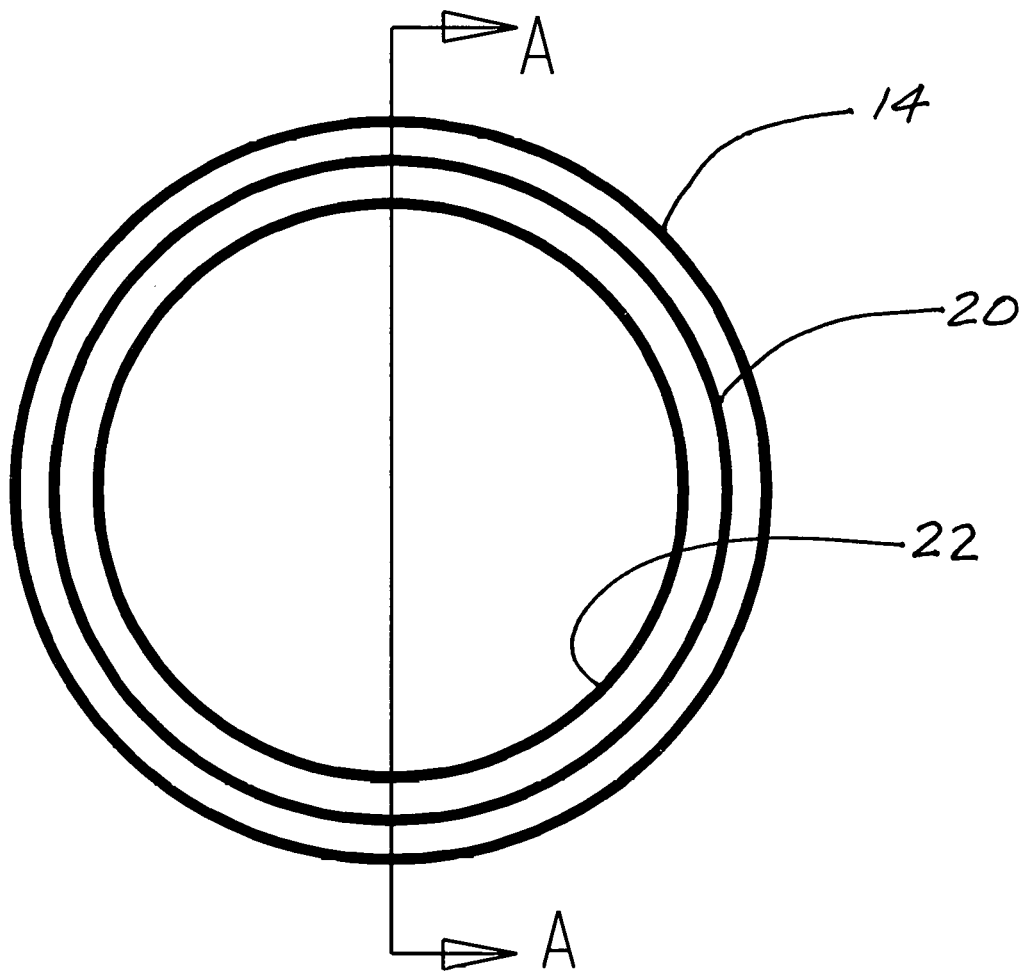
FIG. 5 is frontal diametrical view of modified elastomeric O-ring.
Figure 6:
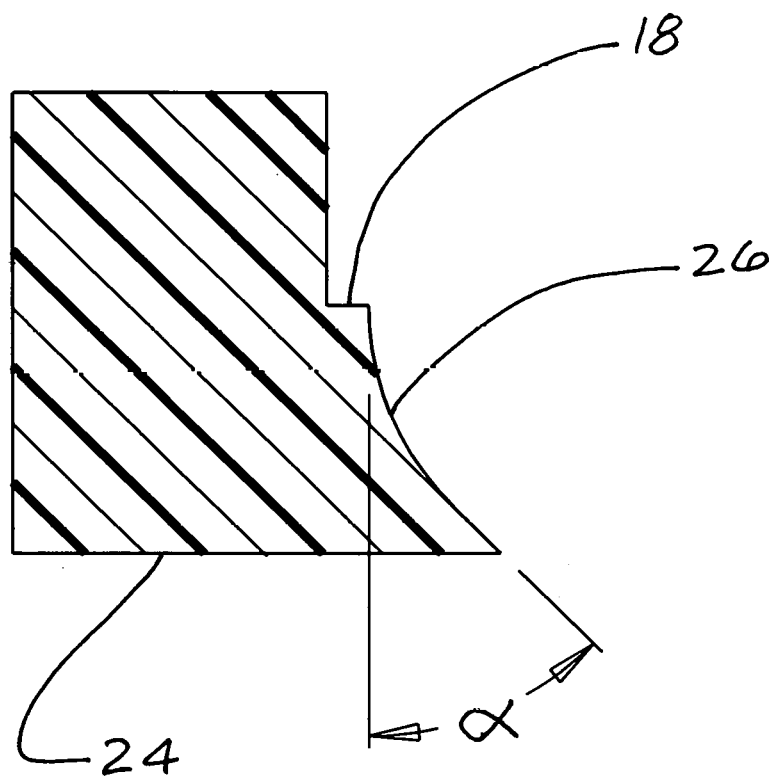
FIG. 6 shows cross-sectional view of backup ring.
Figure 7:
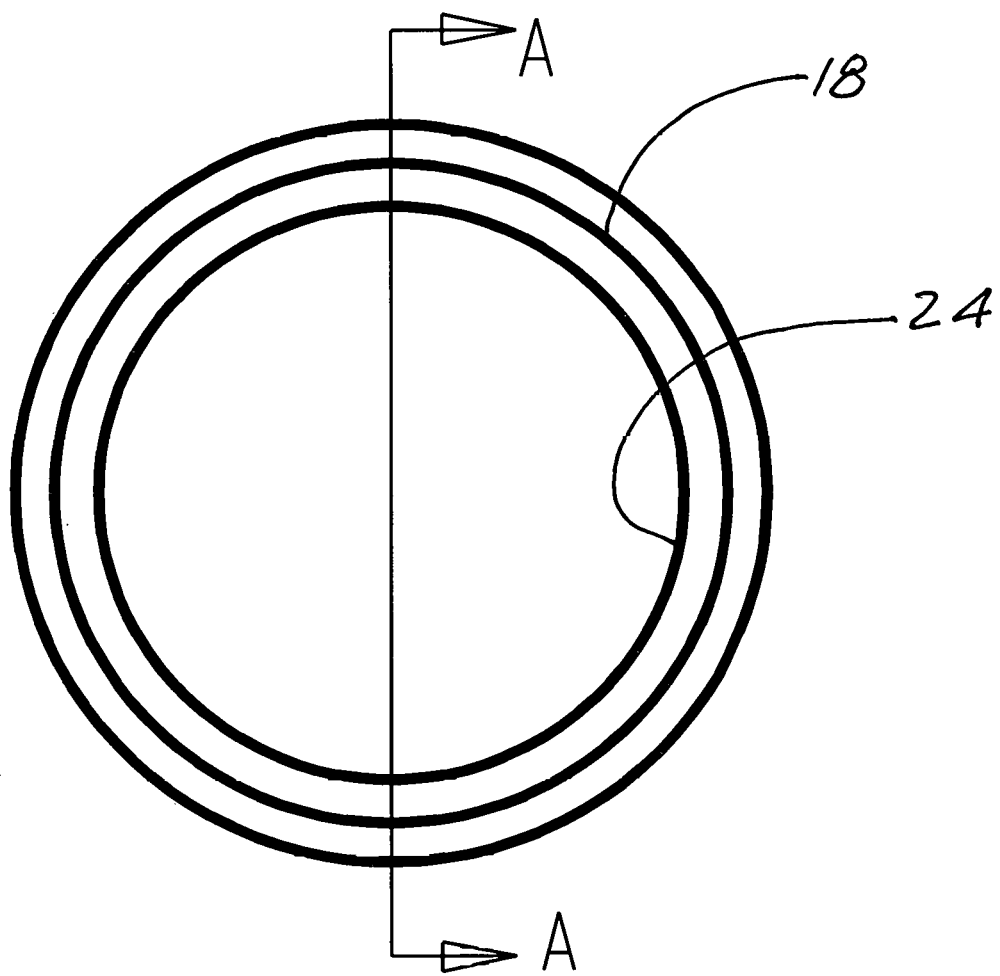
FIG. 7 is frontal diametrical view of backup ring in FIG. 6.
Figure 8:
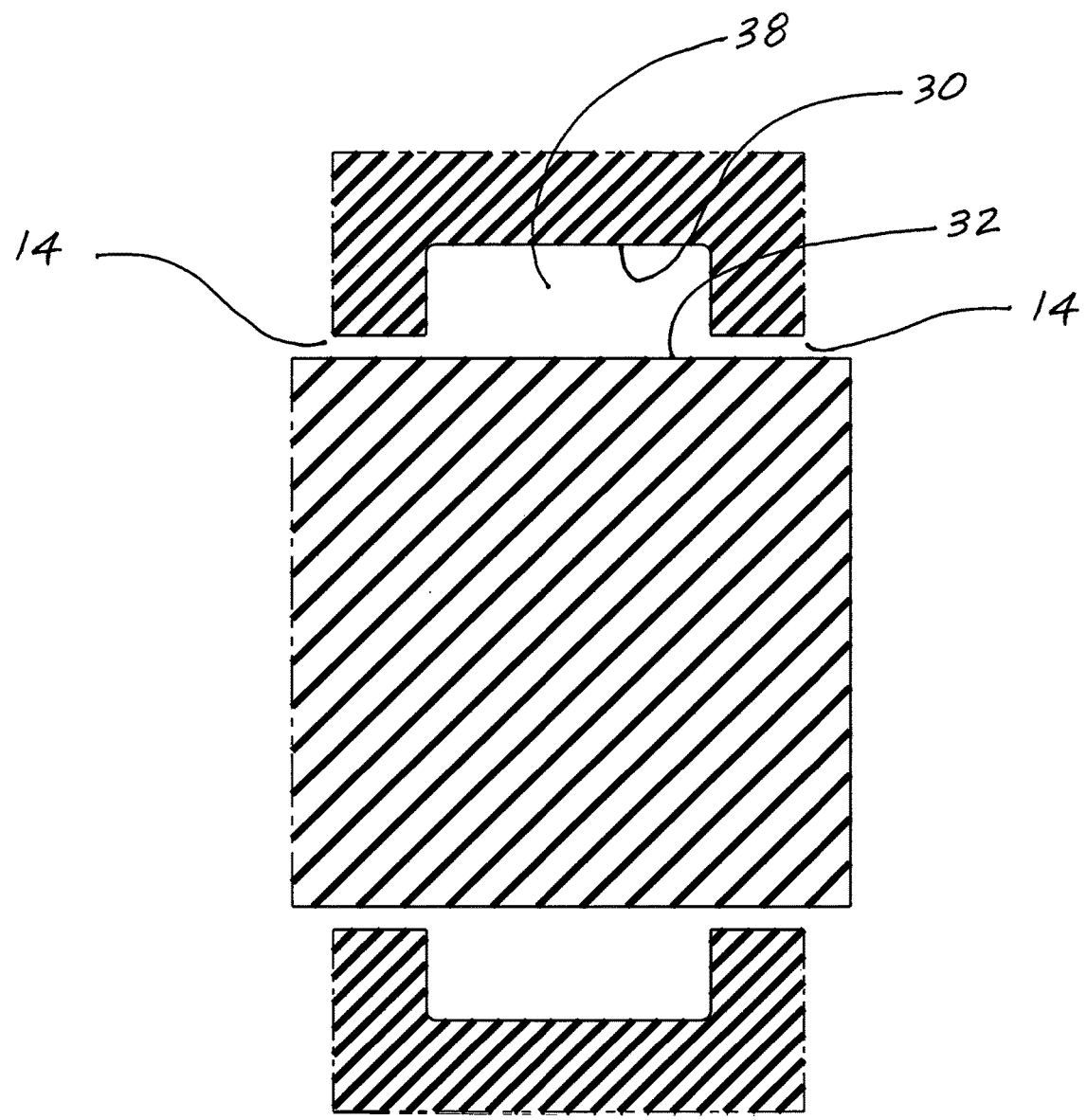
FIG. 8 shows a typical gland consisting of housing, shaft assembly and extrusion gap.
Figure 9:
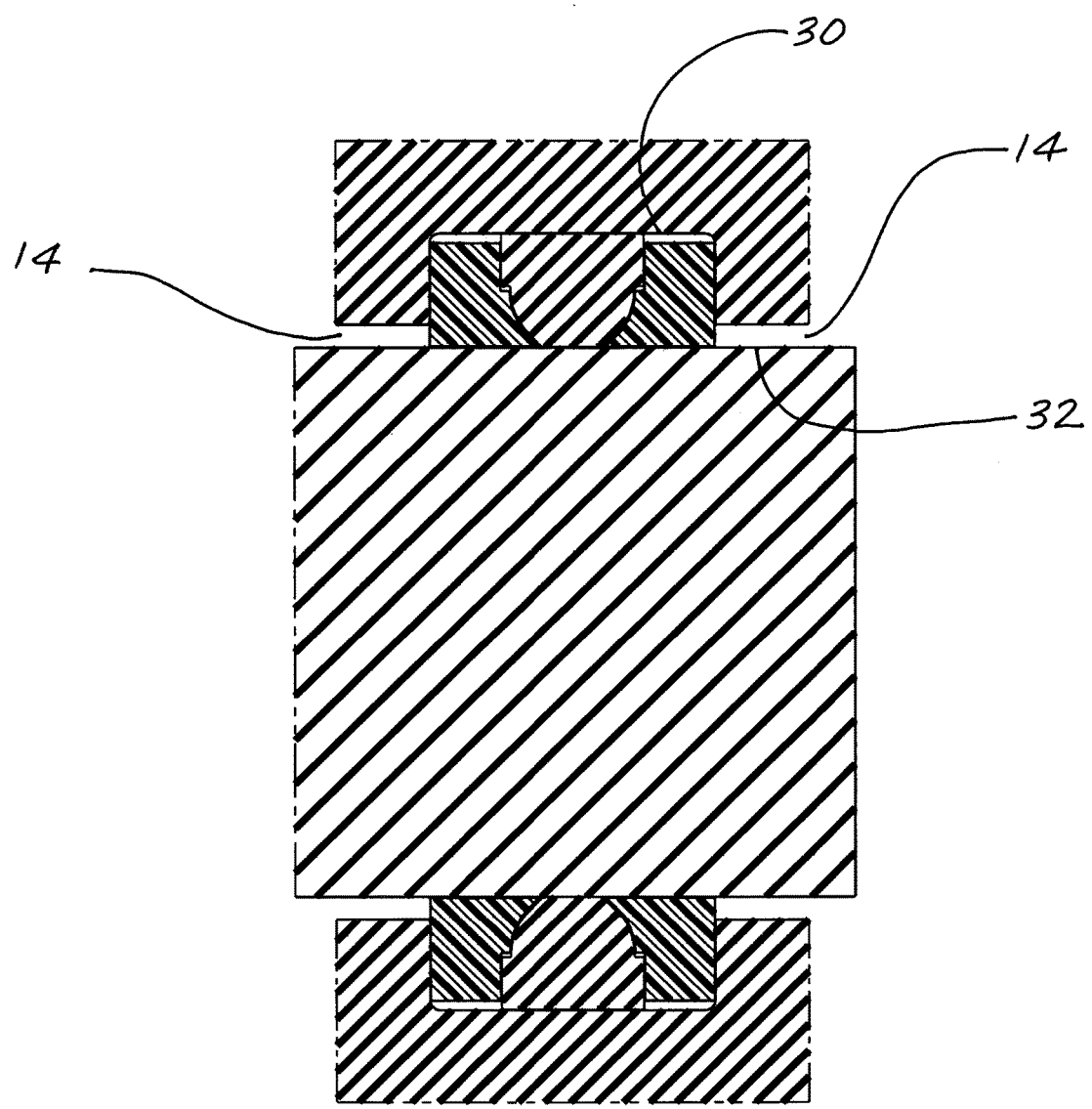
FIG. 9 shows cross-sectional view of Elastic Contact seal assembly installed inside gland of FIG. 8.

FIG. 1 shows an advantageous form of Elastomeric Contact mechanical seal 10, according to the invention consisting of the combination of a modified elastomeric O-ring FIG. 4 made of materials such as Viton or Nitrile having a rounded inside diameter circular surface 22 and a flat outside diameter surface 14 and in addition halfway between inner diameter to outer on each side of elastomeric modified O-ring there is an outwardly step 20 that interlocks with backup ring FIG. 6 inwardly step 18, it is desirable to minimize elastomeric contact at sealing point 22 against dynamic shaft surface 32, as pressure is acted upon Elastomeric Contact Seal assembly 10 inside gland 38, interlocking steps 18 and 20 prevent excessive flow of elastomer towards dynamic shaft surface 32 while preventing modified elastomeric O-ring of FIG. 4 from rotating inside groove 38 and keeping full contact between surface 14 of modified elastomeric O-ring against inside groove diameter surface 30.

As best seen in FIG. 1, radius 26 of backup ring of FIG. 6 follows exact curvature 28 of modified O-ring FIG. 4 just below outwardly step 20 with interconnecting radii 26 and 28 blending with angle α extending away from inwardly step towards modified elastomeric inside diameter surface 22 where α is between 30 to 50 degrees, with similar curvature on opposite side of modified elastomeric O-ring of FIG. 4 creates a minimal contact of elastomeric modified O-ring surface 22 against dynamic shaft surface 32, with this, surface contact between modified elastomeric O-ring of FIG. 4 against dynamic shaft surface 32 is minimized and meantime surface 24 of backup ring FIG. 6 against dynamic shaft surface 32 is maximized, since PTFE has a much lower friction than elastomer the resultant frictional force between ELASTOMERIC CONTACT SEAL ASSEMBLY against dynamic shaft surface 32 is minimized accordingly.

What is claimed is:

1. An elastomeric O-ring comprising an inner half and an outer half in cross section;
    said outer half comprising a substantially rectangular cross section defining a flat outer diametrical surface and;
    said inner half comprising a substantially semi-circular cross section and defining a rounded inner diametrical surface;
    steps are defined where the inner and outer halves meet approximately halfway between said inner and said outer diametrical surfaces on each side of said O-ring; said steps extend inwardly from said outer half to said inner half;
    said substantially semi-circular cross section of said inner half further comprising symmetrical flat radial surfaces defined between said rounded inner diametrical surface and rounded portions of said semi-circular cross section adjacent each step.

2. A system comprising; an elastomeric O-ring comprising an inner half and an outer half in cross section;
- said outer half comprising a substantially rectangular cross section defining a flat outer diametrical surface and;
- said inner half comprising a substantially semi-circular cross section and defining a rounded inner diametrical surface;
- steps are defined where the inner and outer halves meet approximately halfway between said inner and said outer diametrical surfaces on each side of said O-ring; said steps extend inwardly from said outer half to said inner half;
- said substantially semi-circular cross section of said inner half further comprising symmetrical flat radial surfaces defined between said rounded inner diametrical surface and rounded portions of said semi-circular cross section adjacent each step; and
- backup rings on both sides of said O-ring having matching surfaces to elastomeric modified O-ring between, but not including, said inner and outer diametrical surfaces.

* * * * *